US008839385B1

(12) United States Patent
Shipley

(10) Patent No.: US 8,839,385 B1
(45) Date of Patent: *Sep. 16, 2014

(54) SYSTEMS AND METHODS FOR IMPLEMENTING DEVICE-SPECIFIC PASSWORDS

(71) Applicant: United Services Automobile Association (USAA), San Antonio, TX (US)

(72) Inventor: Brian F. Shipley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,190

(22) Filed: Sep. 25, 2012

Related U.S. Application Data

(63) Continuation of application No. 12/193,111, filed on Aug. 18, 2008, now Pat. No. 8,276,196.

(51) Int. Cl.
| | |
|---|---|
| *G06F 21/00* | (2013.01) |
| *G06F 17/30* | (2006.01) |
| *H04L 29/06* | (2006.01) |
| *G06F 21/45* | (2013.01) |
| *G06F 15/00* | (2006.01) |
| *G06F 13/00* | (2006.01) |
| *H04L 9/32* | (2006.01) |

(52) U.S. Cl.
CPC .................................... *G06F 21/45* (2013.01)
USPC ........ 726/6; 726/8; 726/19; 713/155; 705/65; 455/435.1

(58) Field of Classification Search
USPC ....................... 726/6, 8, 19; 705/65; 713/155; 455/435.1
See application file for complete search history.

(56) References Cited

U.S. PATENT DOCUMENTS 6,182,229 B1 * 1/2001 Nielsen .............................. 726/8
6,609,197 B1 8/2003 Ketcham et al.
(Continued)

FOREIGN PATENT DOCUMENTS

EP 1081914 A2 * 3/2001
WO 9946720 9/1999

OTHER PUBLICATIONS

Liqun Chen, Hoon Wei Lim, Guomin Yang; "Cross-Domain Password-Based Authenticated Key Exchange Revisited"; Apr. 2014; Transactions on Information and System Security (TISSEC), vol. 16 Issue 4; Publisher: ACM; pp. 1-32.*

(Continued)

*Primary Examiner* — Andrew Nalven
*Assistant Examiner* — Courtney Fields
(74) *Attorney, Agent, or Firm* — Fish & Richardson P.C.

(57) ABSTRACT

Each of multiple computing devices of a user is registered by obtaining therefrom identifying indicia, obtaining from the user a device-specific password for the computing device, and storing the obtained identifying indicia and device-specific password for the computing device in an entry for the user in a credentials database. The user requests access to a restricted service by way of a particular one of the multiple computing devices with credentials including the device-specific password for the particular computing device, and identifying indicia are obtained therefrom. The obtained identifying indicia and the device-specific password of the particular computing device appear in the entry, and the user is thus granted access to the restricted service.

20 Claims, 4 Drawing Sheets

(56) References Cited

U.S. PATENT DOCUMENTS

| | | |
|---|---|---|
| 6,629,246 B1 * | 9/2003 | Gadi ................................ 726/8 |
| 6,986,038 B1 | 1/2006 | Leah et al. |
| 7,546,276 B2 | 6/2009 | Randle et al. |
| 7,743,409 B2 | 6/2010 | Gonzalez et al. |
| 2002/0083328 A1 | 6/2002 | Riordan |
| 2004/0225709 A1 | 11/2004 | Kubler et al. |
| 2005/0021968 A1 | 1/2005 | Zimmer et al. |
| 2006/0075230 A1 | 4/2006 | Baird et al. |
| 2006/0223530 A1 | 10/2006 | Bumiller |
| 2007/0028299 A1 | 2/2007 | Albano |
| 2007/0074038 A1 | 3/2007 | Arenburg et al. |
| 2007/0162963 A1 | 7/2007 | Penet et al. |
| 2007/0209065 A1 | 9/2007 | Branam et al. |
| 2007/0250920 A1 | 10/2007 | Lindsay |
| 2008/0005798 A1 | 1/2008 | Ross |
| 2009/0228962 A1 | 9/2009 | Pathak |
| 2009/0260077 A1 * | 10/2009 | Zhu et al. ........................ 726/19 |
| 2009/0327741 A1 | 12/2009 | Zimmer et al. |

OTHER PUBLICATIONS

Corrad, A., et al. "Context-based access control management in ubiquitous environments", Abstract, Network Computing and Applications, 2004. (NCA 2004). Proceedings. Third IEEE International Symposium on Aug. 30, 2004. 1 pg.

Li, Dong, et al. "Policy Security Protecting for Negotiating Trust," Signal-Image Technologies and Internet-Based System, 2007. SITIS '07. Third International IEEE Conference on Digital Object Identifier: 10.1109/SITIS.2007.138 Publication Year: Sep. 2007, pp. 213-220.

* cited by examiner

SYSTEMS AND METHODS FOR IMPLEMENTING DEVICE-SPECIFIC PASSWORDS

CROSS-REFERENCE TO RELATED APPLICATIONS

The present application is a continuation of U.S. patent application Ser. No. 12/193,111, filed Aug. 18, 2008, now U.S. Pat. No. 8,276,196; and is related in subject matter to the following commonly assigned applications: U.S. patent application Ser. No. 12/193,124, filed Aug. 18, 2008; and U.S. patent application Ser. No. 12/193,130, filed Aug. 18, 2008; each of which are hereby incorporated by reference in its entirety.

FIELD

The present disclosure is directed to systems and methods that implement access to restricted electronic services by way of passwords, and specifically to such systems and methods that implement device-specific passwords. In particular, the present disclosure relates to implementing multiple passwords for a user accessing the restricted service, each password for being employed in connection with a specific device or type of device employed by the user to access the restricted service.

BACKGROUND

A user employing a computing device and a network connection to interact with a restricted networked service typically must provide credentials or the like in order to gain access to the service. As may be appreciated, such credentials may take the form of an entered user name or other user identifier, a password, and perhaps other identifying indicia that would identify the user. Based on the credentials, then, the service should be reasonably assured that the user accessing the service is indeed entitled to access the restricted service. Likewise, the user should be reasonably assured that only such user can access the restricted service based on such credentials.

Typically, the user enters the credentials including the password at the computing device by way of a keyboard or the like associated with the computing device, which presumes that the password in particular is textual in nature and composed of a string of alphanumeric characters. Oftentimes, the restricted service employs a related access service to receive the credentials including the password and to determine whether the user is entitled to access the restricted service based on the received credentials.

Such an access service may for example maintain a credentials database of acceptable user names with corresponding password information and related indicia. Thus, upon receiving a user name and password from a user attempting to gain access to the restricted service, the access service may first determine that the received user name is in the credentials database. If so, the access service may then determine that the received password matches the password information corresponding to the received user name in the credentials database. If so, the access service may then accept the user and create a session for the accepted user at the restricted service and in doing so allow the accepted user to access the restricted service.

Again presuming that the password in particular is textual in nature and composed of a string of alphanumeric characters, it may be appreciated that the password may be characterized according to a strength thereof. In particular, password strength is a measurement of the effectiveness of a password as an authentication credential. Typically, the strength of a password is a function of length, complexity, and randomness. Also typically, the strength of a password is in opposition with the ease of use of such a password. That is, although a password serves an essential role in computer security, it must also be reasonable and functional for the user. A password that is strong is likely more difficult to remember by a user and therefore saved by the user in a written form, which may be considered a security risk. A password that is easy to remember need not be saved in written form, thus obviating the corresponding security risk, but is more easily guessed at, which poses a much greater security risk and which renders the password relatively weak. All other things being equal, then, a Strong password is likely better than a weak one.

Guidelines for creating a strong password typically suggest that the password be at least a minimum number of characters (12 or 14, e.g.), composed from a set of characters that includes upper-case and lower-case letters, the numbers 0-9, and punctuation symbols normally available at a keyboard of a computing device or the like (i.e., !, @, #, %, ^, &, *, [,], etc.), and composed to include a mix of the upper-case letters, the lower case letters, the numbers, and the punctuation symbols. While not definitive, it has been suggested that such a mix include at least three of the four aforementioned types of characters. As is generally known, a strong password should avoid repetition, dictionary words, letter or number sequences, user names, or biographical information like names or dates.

Examples of strong passwords include: 4pRte!ai@3—which mixes uppercase, lowercase, numbers, and punctuation; Tp4tci2s4U2g!—which is built from a phrase that a user can memorize: "The password for (4) this computer is too (2) strong for you to (4U2) guess!", and mixes types of characters as well; BBslwys90!—which is loosely based on a phrase that a user can memorize: "Big Brother is always right (right angle=90°)!" and mixes types of characters as well; tDl"60Hs7Q—which has characters selected from two stanzas by different methods from a page randomly selected using a 10-sided die; and 152@36291QBs(—which is a unique serial number from a currency note with added random elements; among others.

Notably, the use of upper-case characters, lower-case characters, numbers, and/or punctuation symbols in a strong password requires that the user entering such strong password expend a heightened amount of effort in locating and typing such characters on a keyboard of a computing device. Such heightened effort does not arise to a particularly onerous level when the keyboard is a full-featured keyboard such as that which may be typically associated with a personal computer or the like. However, and significantly, the same is not true when the keyboard is a more limited-featured keyboard such as that which may be associated with a mobile telephone or even with a portable data assistant or the like.

In the case of such a mobile telephone or the like, the keyboard may be a 12-character keypad with additional control keys or the like, as is known, while in the case of such a portable data assistant or the like, the keyboard may be a reduced QWERTY keypad or the like, as is also known. Such keypads or keyboards do usually provide access to all manner and form of the aforementioned upper-case characters, lower-case characters, numbers, and punctuation symbols that are required for a strong password, as is known. However, such provided access may require an extended series of keystrokes, particularly if the character being accessed is a punctuation symbol. Thus, entry of a password using characters that require such extended series of keystrokes can take an excessive amount of time that contributes to the aforementioned onerous level of heightened effort. Moreover, such an extended series of keystrokes heightens the probability that a particular character is improperly entered, resulting in the need to re-enter the password and further contributing to the aforementioned onerous level of heightened effort.

Accordingly, a need exists for a system and method that reduces the aforementioned onerous level of heightened effort that may be required to enter a password such as a strong password in a computing device such as a computing device with a more limited-feature keyboard.

SUMMARY

The aforementioned needs are satisfied at least in part by systems and methods employed to provide a user with access to a restricted service on a network, where the user employs a particular computing device communicatively coupled to the network. Credentials are received from the user upon the user requesting access to the restricted service, where the credentials include a user identifier and a master password that is not specific to the computing device. Also, identifying indicia that at least nearly uniquely identify the computing device are obtained therefrom.

An entry for the user is determined in a credentials database from the received user identifier, and it is determined from the entry for the user that the computing device is not registered as having a device-specific password for use by the user with the restricted service inasmuch as the obtained identifying indicia of the computing device does not appear in the entry. However, it is also determined that information on the master password in the received credentials appears in the entry, and based thereon, the user is granted access to the restricted service.

Upon granting the user access to the restricted service, a device-specific password for the computing device is obtained from the user. The obtained identifying indicia of the computing device and information on the obtained device-specific password for the computing device are stored in a sub-entry of the entry for the user in the credentials database such that the computing device of the user corresponding to the obtained identifying indicia is registered as having a device-specific password for use by the user with the restricted service.

Thereafter, credentials are again received from the user upon the user requesting access to the restricted service. Here, the credentials include a user identifier and the device-specific password specific to the computing device. Also, identifying indicia that at least nearly uniquely identify the computing device are again obtained therefrom.

An entry for the user is again determined in the credentials database from the received user identifier, although now it is determined from the entry for the user that the computing device is registered as having a device-specific password for use by the user with the restricted service inasmuch as the obtained identifying indicia of the computing device does appear in the entry. Moreover, it is also now determined that information on the device-specific password in the received credentials also appears in the sub-entry of the entry, and based thereon, the user is granted access to the restricted service.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
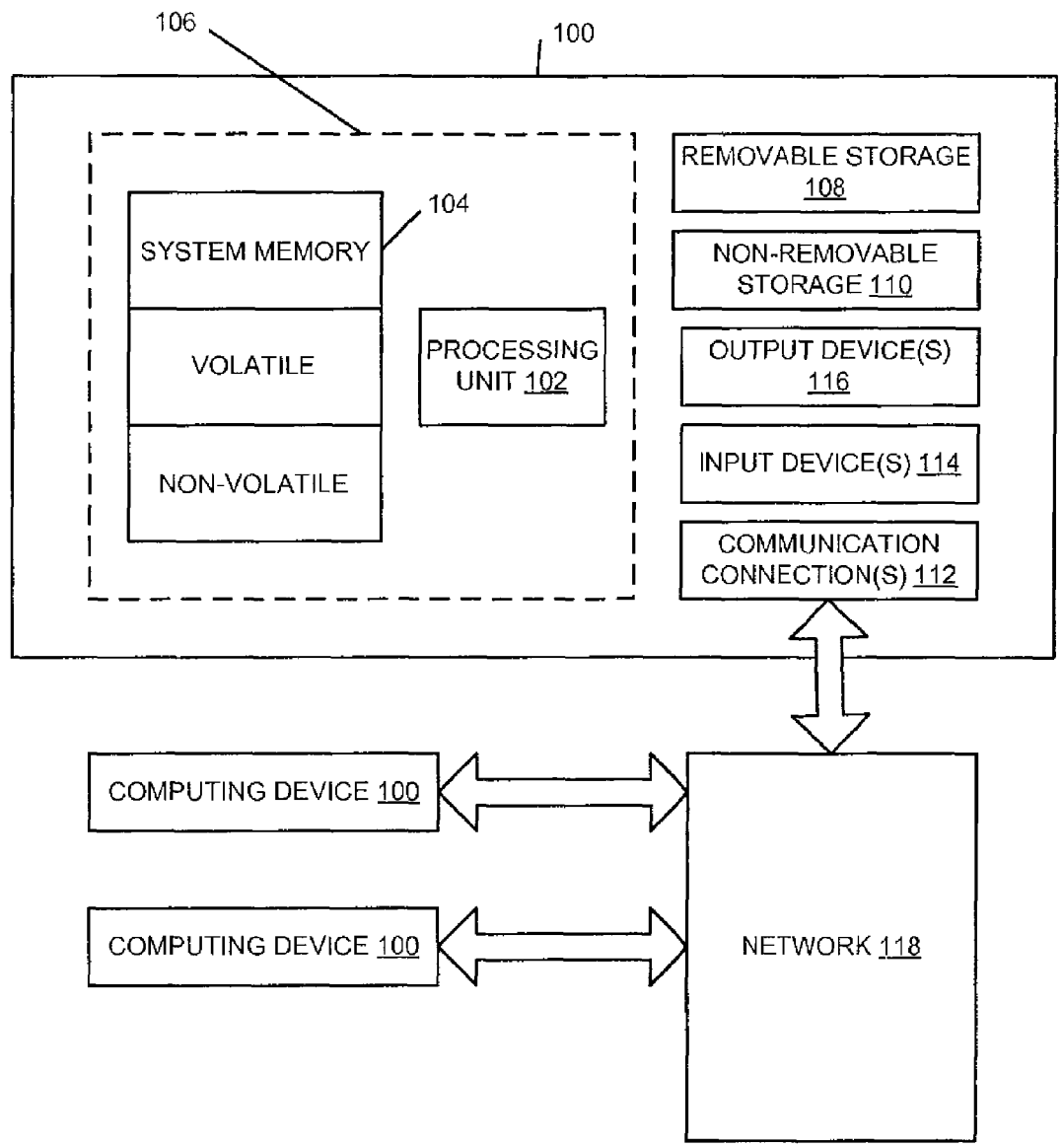
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Restricted Service and Password Therefor

Figure 2:
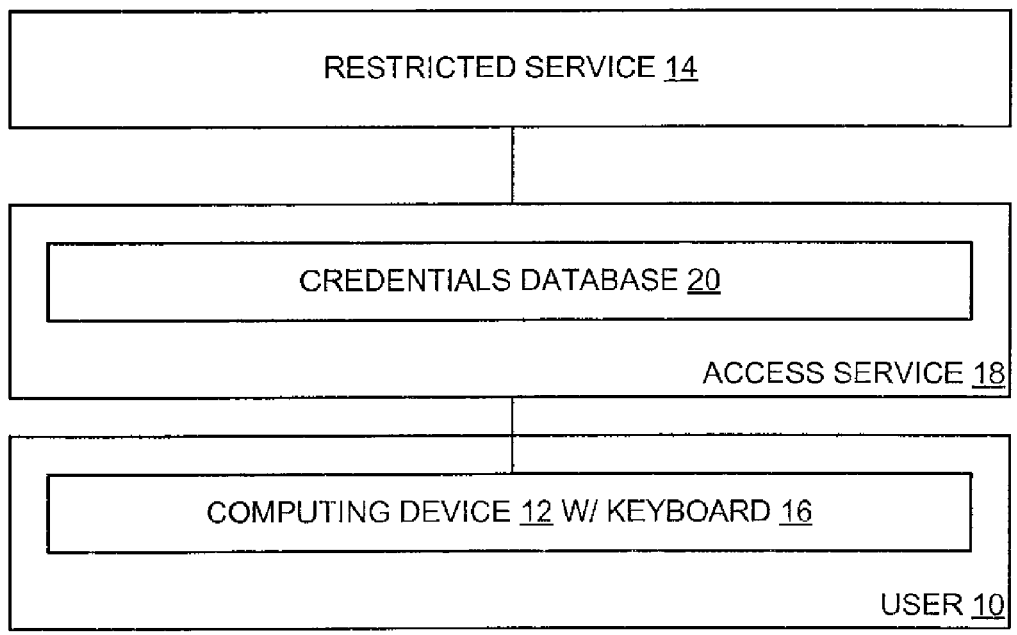
FIG. 2 is a block diagram of a system including a user at a computing device accessing a restricted service in accordance with various embodiments of the present innovation.

In various embodiments of the present innovation, and turning now to FIG. 2, it is seen that a user 10 employs a computing device 12 with an appropriate network connection to interact with a restricted networked service 14. As may be appreciated, the user 10 and the restricted service 14 may be most any user and restricted service without departing from the spirit and scope of the present innovation. For one example, the restricted service 14 may be a banking or financial service provided by a bank or other financial institution, in which case the user 10 may be a holder of an account as provided by the bank or other financial institution, and may be accessing the service 14 to obtain an account balance or perform a banking or financial transaction. For another example, the restricted service 14 may be an ordering service provided by a retailer or wholesaler of goods, in which case the user 10 may be a customer of the retailer or wholesaler, and may be accessing the service 14 to order goods therefrom. In any case, the restricted service 14 is likely implemented by or on behalf of an entity by way of one or more servers or the like on an inter-network communications system such as the Internet.

As will be set forth below in more detail, the computing device 12 employed by the user 10 may be most any computing device without departing from the spirit and scope of the present innovation, although it is to be appreciated that some computing devices 12 may be more amenable than others depending on the function performed by the user 10 at the service 14. For example, a user 10 may employ a mobile telephone with a browser or the like as the computing device 12 when obtaining the aforementioned account balance at a banking or financial service 14 or when ordering the aforementioned goods at an ordering service 14. However, it may instead be simpler and faster for such user 10 to employ a more traditional personal computer as the computing device 12 if significant entry of information by the user 10 into a keyboard 16 or the like of the computing device 12 is required.

In any case, the user 10 typically provides credentials or the like by way of the computing device 14 and the keyboard 16 thereof in order to gain access to the restricted service 14. As was set forth above, such credentials may take the form of an entered user name or other user identifier, a password, and perhaps other identifying indicia that would identify the user. Based on the credentials, then, the restricted service 14 should be reasonably assured that the accessing user 10 is indeed entitled to access such restricted service 14. Likewise, the user 10 should be reasonably assured that only such user 10 can access the restricted service 14 based on such credentials.

Typically, the user 10 enters the credentials including the password at the computing device 12 by way of the keyboard 16 or the like associated with the computing device 12, especially if the password is textual in nature and composed of a string of alphanumeric characters. As shown in FIG. 2, the restricted service 14 may employ a related access service 18 to receive the credentials including the password and to determine whether the user 10 is entitled to access the restricted service 14 based on the received credentials.

As was set forth above, the access service 18 may for example maintain a credentials database 20 (best shown in FIG. 3) of acceptable user names with corresponding password information and related indicia. Thus, and again, upon receiving a user name and password from the user 10 upon attempting to gain access to the restricted service 14, the access service 18 may first determine that the received user name is in the credentials database 20. If so, the access service 18 may then determine that the received password matches the password information corresponding to the received user name in the credentials database 20. If so, the access service 18 may then accept the user 10 and create a session or the like for the accepted user 10 at the restricted service 14 and in doing so allow such accepted user 10 to access such restricted service 14.

Note that the access service 18 may match the password as entered by the user 10 to the password information in the credentials database 20. However, as a security matter, the password as entered by the user 10 may be obfuscated at the computing device 12 or at the access service 18, in which case the access service 18 may match the password as obfuscated to the password information in the credentials database 20. Such obfuscating is known, and may comprise hashing the password, applying a cryptographic key to the password, or the like.

As was alluded to above, the password employed by the user 10 should be relatively strong, and therefore may be composed from a set of characters that includes upper-case and lower-case letters, the numbers 0-9, and punctuation symbols normally available at the keyboard 16 of any computing device 12 or the like (i.e., !, @, #, %, ^, &, *, [,], etc.), and composed to include a mix of the upper-case letters, the lower case letters, the numbers, and the punctuation symbols. However, and again, the use of upper-case characters, lower-case characters, numbers, and/or punctuation symbols in a strong password requires that the user 10 entering such strong password expend a heightened amount of effort in locating and typing such characters on the keyboard 16 of a computing device 12.

Such heightened effort may not arise to a particularly onerous level when the keyboard 16 is a full-featured keyboard such as that which may be typically associated with a computing device 12 such as a personal computer or the like. However, and significantly, the same is not true when the keyboard 16 is a more limited-featured keyboard such as that which may be associated with a computing device 12 of a mobile telephone or even with a portable data assistant or the like.

In such cases, the limited-feature keyboard 16 may have a reduced number of keys and may require an extended series of keystrokes to access each character, particularly if the character is a punctuation symbol. For example, on a reduced QWERTY keyboard 16 of a portable data assistant, entering a semi-colon can involve perhaps as much as 3 or 4 key strokes, while on a 12-character keypad or the like of a mobile telephone computing device 12, entering such semi-colon can involve perhaps as much as 8 or 10 key strokes, as is known. Thus, entry of a password using characters that require such extended series of keystrokes can take an excessive amount of time that contributes to the aforementioned onerous level of heightened effort. Moreover, such an extended series of keystrokes heightens the probability that a particular character is improperly entered, resulting in the need to re-enter the password and further contributing to the aforementioned onerous level of heightened effort.

Employing Device-Dependent Passwords

In recognition of the aforementioned onerous level of heightened effort that may be required for a user 10 to enter a password into a computing device 12, especially if the computing device 12 does not have a full-featured keyboard 16, and especially if the password includes characters such as punctuation symbols that require an extended series of keystrokes to access such characters, and in various embodiments of the present innovation, the password entered into each device 12 by a user 10 may differ in a manner generally consistent with such effort, such that each password is specific to a particular device 12 of the user 10. For example, for a computing device 12 of the user 10 having a full-featured keyboard 16, the password may be a relatively stronger password that may have characters such as punctuation symbols. Likewise, for a computing device 12 of the user 10 having a minimally featured keyboard 16, the password may be a relatively weaker password that does not employ characters such as punctuation symbols that would require an extended series of keystrokes.

In the latter case, it is to be appreciated that the relatively weaker password as employed on the computing device 12 of the user 10 having the minimally featured keyboard 16 represents a security risk inasmuch as the password is relatively easier to be guessed at. Accordingly, in various embodiments of the present innovation, the access service 18 ties the relatively weaker password to the corresponding device 12 by way of identifying indicia of such device 12, such as for example the MAC (Media Access Control) address of the device 12 or another indicia of the device 12 which is unique or nearly unique to the device 12.

Note that the MAC address of the device 12 may be considered to be an especially well-suited identifying indicia of the device 12 inasmuch as such MAC address is readily available and easily queried for, although other appropriate identifying indicia of the device 12 may also be employed. Note further that the MAC address of a device 12 may be combined with other indicia of the device 12 or that other indicia of the device 12 without the MAC address may alternately be combined in any appropriate manner to create a composite indicia for the device 12. For example, the composite indicia for the device 12 may be a concatenation or hash or encryption of various indicia of the device 12 that may be faithfully recreated as need be. In any event, the composite indicia/identifying indicia employed for the device 12 should be not be easily spoofed.

Note too that the weaker password is counterbalanced by the use of the tying identifying indicia of the device 12, as may be appreciated, such that the weaker password in combination with the tying identifying indicia of the device 12 is actually less of a security risk overall than the stronger password used without any tying identifying indicia of the device 12. In fact, it may well be that the weaker password in combination with the tying identifying indicia of the device 12 is used even in connection with the computing device 12 of the user 10 having the full-featured keyboard 16, in various embodiments of the present innovation.

Figure 3:
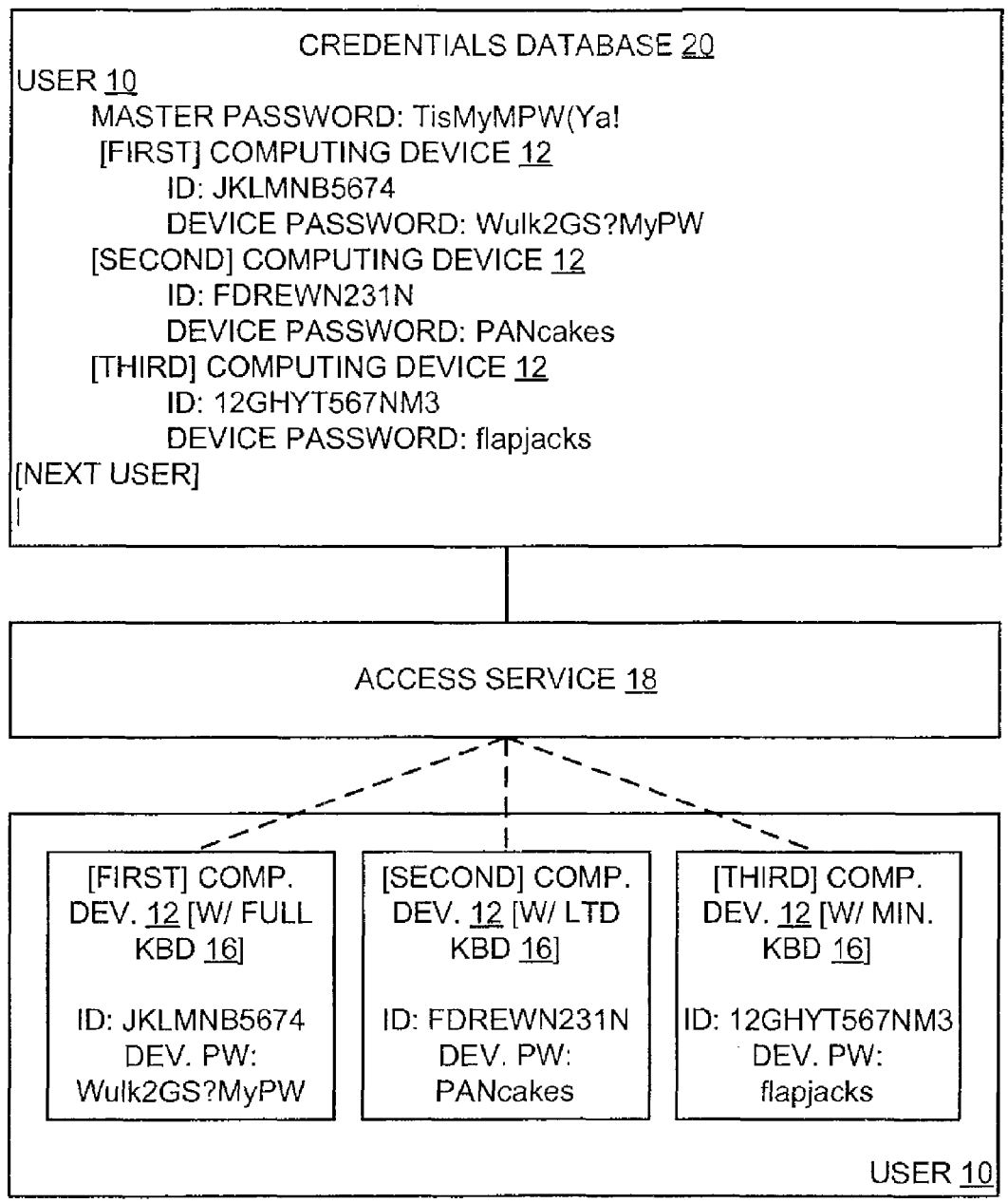
FIG. 3 is a block diagram including various features of the system of FIG. 2, and shows a plurality of computing devices of the user, each having a device-specific password and device-specific identifying indicia in accordance with various embodiments of the present innovation.

Turning now to FIG. 3, then, it is seen that a user 10 has a plurality of computing devices 12 that may be employed to access the restricted service 14 (FIG. 2), and that each device 12 has a corresponding identifying indicia and a password specific to such device 14. Each device 12 of the user 10 may be most any device 12, such as for example, a personal computer of the user 10 at home, a personal computer of the user 10 at work, a mobile telephone device of the user 10 with a browser or the like and employed for work, a mobile telephone device of the user 10 with a browser or the like and employed for personal purposes, a personal data assistant or the like of the user 10 with a browser or the like and employed for work, a personal data assistant or the like of the user 10 with a browser or the like and employed for personal purposes, etc. As shown in FIG. 3, a first device 12 has a full keyboard (KBD) 16 and a higher strength password, a second device 12 has a more limited keyboard 16 and a mid-level strength password, and a third device 12 has a minimal keyboard 16 and a lower strength password.

As also seen in FIG. 3, the access service 18 of the restricted service 14 maintains in the credentials database 20 for each device 12 the device-specific password thereof along with corresponding identifying indicia (ID) of the respective device 12. Additionally, and as seen, the access service 18 maintains a master password for the user in the credentials database 20, which as may be appreciated should be a relatively strong password. As will be set forth below, the master password is used when establishing a device-specific password for a particular device 12.

As should be understood, the structure and format of the credentials database 20 may be most any appropriate structure and format, as long as the credentials database 20 stores therein the requisite information in a manner designed to promote ease of use by the access service 18. For example, and as seen in FIG. 3, such credentials database 20 may include an entry for the user 10 along with the master password of such user 10, and for each device 12 thereof a sub-entry with the obtained indicia and corresponding device-specific password, although other items may also be included in the entry and sub-entries for the user 10.

Figure 4:
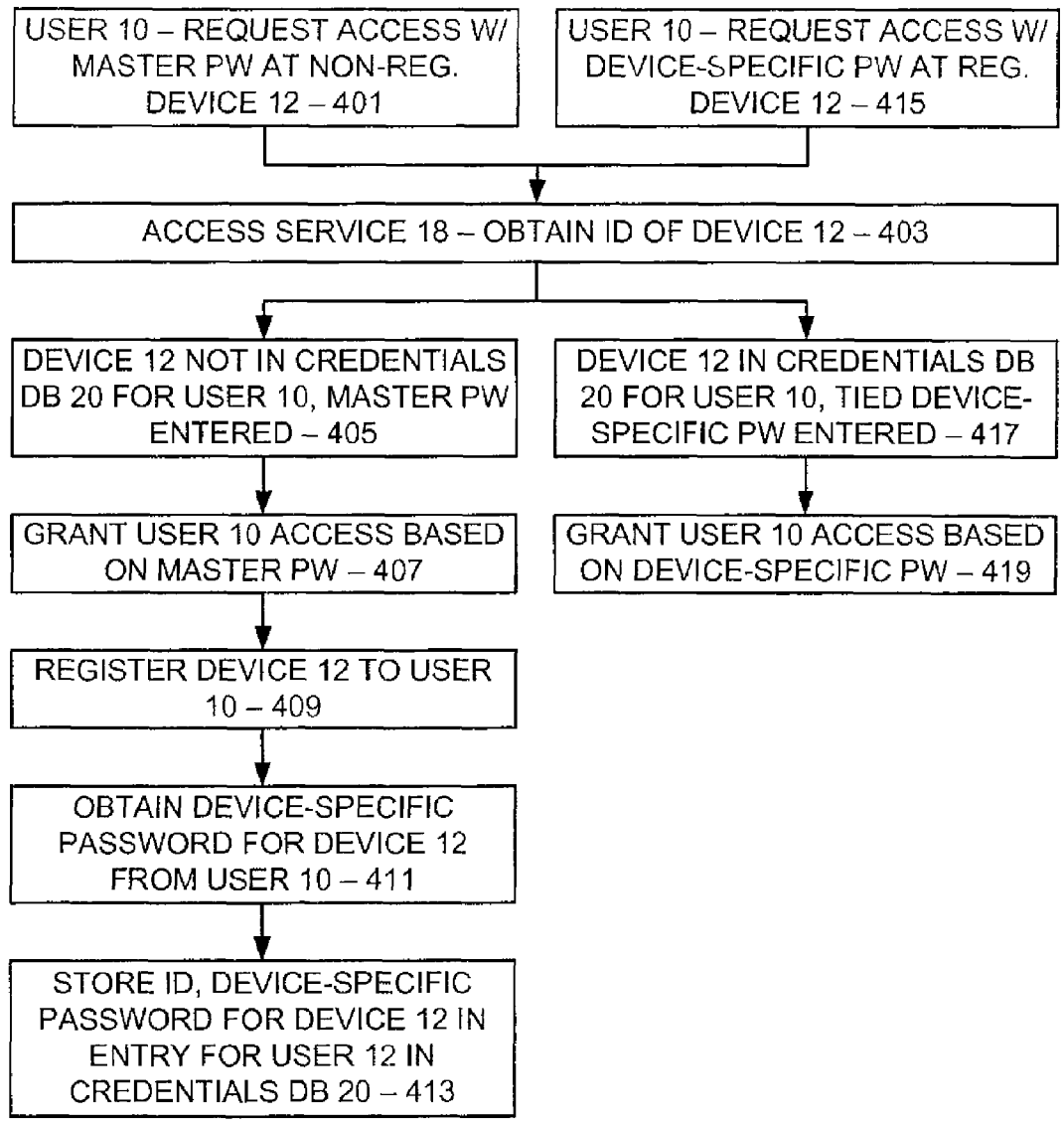
FIG. 4 is a flow diagram showing key actions performed in connection with the system of FIGS. 2 and 3 in accordance with various embodiments of the present innovation.

Turning now to FIG. 4, it is to be understood, that a device 12 of the user 10 is to be registered with the access service 18 in the following manner. Preliminarily, the user 10 requests access to the restricted service 14 by way of a 'log-in' performed at a browser or the like associated with the device 12 to be registered, and in doing so the user 10 enters the user name or the like and the master password thereof (401). As may be appreciated, use of the master password is believed to be necessary inasmuch as the access service 18 does not as yet 'know' the device 12 to be registered. As may also be appreciated, use of the master password, which again should be a relatively strong password, may require an onerous level of heightened effort, especially if the device 12 to be registered has a limited or minimally functional keyboard 16, such as may be the case with a mobile telephone device 12, a personal data assistant device 12, or the like. Nevertheless, the requested access/log-in based on the master password likely need only be performed once with regard to the device 12 to be registered, and accordingly such effort likely will not be experienced again in connection with the device 12 to be registered, at least for a relatively long period of time.

Significantly, and in various embodiments of the present innovation, the access service 18 automatically obtains the identifying indicia from the device 12 in a manner that is known or should be apparent to the relevant public (403), and based on such collected identifying indicia determines that the device 12 has no sub-entry in the entry for the user 10 in the credentials database 20, but that the master password has been entered (405). Thus, the access service 18 grants the user 10 access to the restricted service 14 based on the entered master password (407), and as should be understood, the user 10 with such access may then employ the restricted service 14 in an appropriate manner.

In addition to granting the user 10 access to the restricted service 14 based on the entered master password as at 407, and in various embodiments of the present innovation, the access service 18 also automatically offers to register the device 12 for the user 10 (409). Presuming registration is desired, the access service 18 obtains a corresponding device-specific password from the user 10 for such device 12 (411), and appropriately places such obtained indicia of the device 12 and corresponding device-specific password in the entry for the user 10 in the credentials database 20 (413), perhaps with the corresponding device-specific password in an obfuscated form, and in a manner such as that shown in FIG. 3. Thus, the device 12 is now registered at the access service 18 inasmuch as the access service 18 has a device-specific password for the device 12 and also identifying indicia of the device 12 tied to the device-specific password.

As may now be appreciated, the user 10 at a later time may again employ the registered device 12 to access the restricted service 14 by way of the access service 18 in the following manner. Again, the user 10 requests access to the restricted service 14 by way of a 'log-in' performed at a browser or the like associated with the device 12 to be registered, but in doing so the user 10 enters the device-specific password thereof as was set at 411 (415). Thus, the master password need not be employed. Again, the access service 18 automatically obtains the identifying indicia from the device 12 in a manner that is known or should be apparent to the relevant public, as at 403. This time, however, the access service 18 determines based on such collected identifying indicia that the device 12 has a sub-entry in the entry for the user 10 in the credentials database 20, and that the corresponding ('tied') device-specific password in the sub-entry has been entered (417). Thus, the access service 18 grants the user 10 access to the restricted service 14 based on the entered device-specific password (419). With such access, the user 10 again may then employ the restricted service 14 in an appropriate manner.

In an alternate embodiment, the user 10 at the later time may again employ the registered device 12 to access the restricted service 14, but in doing so enters either the device-specific password or the master password thereof at 415. Here, and once again, the access service 18 automatically obtains the identifying indicia from the device 12 in a manner that is known or should be apparent to the relevant public, as at 403, and determines based on such collected identifying indicia that the device 12 has a sub-entry in the entry for the user 10 in the credentials database 20, as at 417. However, the access service 18 then determines whether the corresponding ('tied') device-specific password in the sub-entry has been entered. If so, the access service 18 grants the user 10 access to the restricted service 14 based on the entered device-specific password as at 419. If not, the access service 18 then determines whether the master password in the entry has been entered. If so, the access service 18 grants the user 10 access to the restricted service 14 based on the entered master password. If not, the access service 18 denies such access.

Note that in various embodiments of the present innovation, the access service 18 upon granting access to the user 10 may direct the browser of the device 12 of such user 10 to a particular form of the restricted service 14 according to the device 12. Thus, if the device 12 is determined to be a relatively full-featured computing device 12 such as a personal computer or the like, the access service 18 may direct the browser to a corresponding relatively full-featured site representative of the restricted service 14. Likewise, if the device 12 is determined to be a relatively minimally featured computing device 12 such as a mobile telephone device or a personal data assistant or the like, the access service 18 may direct the browser to a corresponding relatively minimally featured site representative of the restricted service 14. Determining a type of the device 12 may be performed in any appropriate manner. For example, such typing information often may be derived based on the type of browser of the device 12, as is known.

Note too that it may be that a user 10 wishes to un-register a particular device 12 thereof, such as for example if the device 12 has become lost or stolen. In such a situation the device 12 cannot itself be employed to perform such un-registering, of course, and accordingly another device 12 is to be employed. As may be appreciated, the another device 12 may be a registered device 12 of the user 10 upon which the user has logged in based on a corresponding device-specific password or based on a master password, or else may be a non-registered device 12 of the user 10 upon which the user has logged in based on a master password. In any case, and as may be appreciated, with such another device 12, an appropriate de-registration procedure is actuated, at which the particular device 12 to be un-registered is identified and un-registered. As may now be appreciated, such un-registering is achieved by removing or otherwise de-activating the corresponding sub-entry in the entry for the user 10 in the credentials database 20.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided that reduce an onerous level of heightened effort that may be required for a user 10 to access a restricted service 14 by entering a password such as a strong password in a computing device 12 of such user 10 such as a computing device 12 with a more limited-feature keyboard 16. Each device 12 of the user 10 is registered with an access service 18 of the restricted service 14 and has a separate device-specific password. Each separate password may be tailored to a reasonable amount of effort needed to enter same in the keyboard 16 of the corresponding device 10, although such tailoring is not a requirement of the various embodiments of the present innovation.

It should be appreciated that changes could be made to the embodiments described above without departing from the innovative concepts thereof. For example, although the present innovation is set forth primarily in terms of entering a textual password, the password may take another form, such as for example a spoken password, or may be replaced by a biometric reading such as a scanned fingerprint or iris of a user 10, among other things. It should be understood, therefore, that this innovation is not limited to the particular embodiments disclosed, but it is intended to cover modifications within the spirit and scope of the present innovation as defined by the appended claims.

The invention claimed is:

1. A non-transitory computer-readable storage medium having computer-executable instructions stored thereon and executable by a processor to:
    receive, from a user, a user identifier and a master password that is not specific to at least one computing device, the at least one computing device communicatively coupled to a network;
    obtain, from the at least one computing device, identifying indicia associated with the at least one computing device;
    determine a database entry for the user from the user identifier;
    determine, via the database entry, that the at least one computing device is not registered and lacks a device-specific password for the user;
    provide the user access to a restricted service on the network based on the master password;
    automatically offer to register the at least one computing device for the user, wherein the at least one computing device is un-registered using a second computing device based on user input;
    obtain, from the user, a device-specific password for the at least one computing device following access to the restricted service;
    store the identifying indicia of the at least one computing device and the device-specific password for the computing device in the database to register the at least one computing device; and
    direct the at least one computing device to a site representative of the restrictive service based on a determined type of the at least one computing device.

2. The medium of claim 1, wherein the registered at least one computing device may be subsequently employed to access the restricted service with the master password.

3. The medium of claim 1, wherein the registered at least one computing device may be subsequently employed to access the restricted service with the device-specific password.

4. The medium of claim 1, wherein the at least one computing device includes a limited keyboard.

5. The medium of claim 1, wherein the site representative of the restrictive service is a minimally featured site.

6. The medium of claim 1, wherein the at least one computing device is a mobile telephone.

7. The medium of claim 1, wherein the at least one computing device is a personal data assistant.

8. A non-transitory computer-readable storage medium having computer-executable instructions stored thereon and executable by a processor to:

receive, from a user, a user identifier and a master password that is not specific to a computing device, the computing device communicatively coupled to a network;

obtain, from the computing device, an identifying indicium associated with the computing device;

determine a database entry for the user from the user identifier;

automatically offer to register the computing device for the user, wherein registration of the device permits the user to un-register the computing device using a second computing device based on the user input;

determine, via the database entry, that the computing device is registered and has an associated device-specific password;

provide the user access to a restricted service on the network based on the associated device-specific password; and direct the computing device to a site representative of the restrictive service based on a determined type of the computing device.

9. The medium of claim 8, wherein the identifying indicium associated with the computing device and the associated device-specific are coupled to each other.

10. The medium of claim 8, wherein the identifying indicium associated with the computing device is included in an encryption of identifying indicia.

11. The medium of claim 8, wherein the identifying indicium associated with the computing device is included in a concatenation of identifying indicia.

12. The medium of claim 8, wherein the computing device employs a browser to access the restricted service.

13. The medium of claim 8, wherein a request to access the restricted service is submitted via a log-in site.

14. The medium of claim 8, wherein the master password includes an upper-case character, a lower-case character, and a number.

15. A non-transitory computer-readable storage medium having computer-executable instructions stored thereon and executable by a processor to:

obtain a respective identifying indicium for each of a plurality of computing devices;

obtain a respective device-specific password for each of the plurality of computing devices;

store each respective identifying indicium and each respective device-specific password in a database;

receive a request to access a restricted service via one of the plurality of computing devices, wherein the one of the plurality of computing devices is communicatively coupled to a network and the user request includes the respective device-specific password specific to the one of the plurality of computing devices;

obtain, from the one of the plurality of computing devices, the respective identifying indicium;

automatically offer to register the plurality of computing devices for the user, wherein registration of the plurality of computing devices permits the user to un-register a particular device based on user input by actuating a de-registration procedure;

determine, from the database, that the one of the plurality of computing devices is registered;

provide access via the one of the plurality of computing devices to the restricted service based on the obtained respective identifying indicium and the obtained respective device-specific password; and direct the one of the plurality of computing devices to a site representative of the restrictive service based on a determined type of the one of the plurality of computing devices.

16. The medium of claim 15, having computer-executable instructions stored thereon and executable by a processor to offer to register additional computing devices.

17. The medium of claim 15, having computer-executable instructions stored thereon and executable by a processor to un-register a second of the plurality of computing devices.

18. The medium of claim 17, wherein at least one of the plurality of computing devices is utilized to un-register the second of the plurality of computing devices.

19. The medium of claim 17, wherein the respective device-specific password for the second of the plurality of computing devices is removed from the database.

20. The medium of claim 17, wherein the respective identifying indicium for the second of the plurality of computing devices is removed from the database.

\* \* \* \* \*